Dec. 22, 1936. D. D. KNOWLES Re. 20,210

SAFETY SYSTEM

Original Filed May 26, 1928 2 Sheets-Sheet 1

INVENTOR

Dewey D. Knowles.

BY

Wesley G. Carr

ATTORNEY

Dec. 22, 1936. D. D. KNOWLES Re. 20,210

SAFETY SYSTEM

Original Filed May 26, 1928 2 Sheets-Sheet 2

INVENTOR
Dewey D. Knowles.
BY
Wesley G. Carr
ATTORNEY

Reissued Dec. 22, 1936 Re. 20,210

UNITED STATES PATENT OFFICE 20,210

SAFETY SYSTEM

Dewey D. Knowles, Forest Hills, Pa., assignor to Westinghouse Electric & Manufacturing Company, a corporation of Pennsylvania Original No. 1,809,280, dated June 9, 1931, Serial No. 280,710, May 26, 1928. Application for reissue October 29, 1932, Serial No. 640,302

11 Claims. (Cl. 158—117.1)

The subject matter of this application is related to my application Serial No. 164,625, filed January 29, 1927.

My invention relates to safety control systems and particularly to control systems intended for use in connection with furnaces using a liquid or gaseous fuel.

One object of my invention is to provide a safety system that will be actuated by a failure of the fuel supply pressure and will so operate as to prevent the accumulation of unburned fuel in the furnace upon renewal of the fuel-supply pressure.

Another object of my invention is to provide a safety control system that shall be controlled by a flame of the burning fuel.

Another object of my invention is to provide a safety control system that shall be controlled by, and in accordance with, the conductivity of an ionizable gap.

Another object of my invention is to provide a safety control system that shall be controlled by, and in accordance with, the conductivity of an air gap subjected either directly or indirectly to the flame of a furnace or to a fluid medium.

Another object of my invention is to provide a safety system actuable in accordance with the conductivity of a gap normally subjected to a moving fluid medium upon interruption of the flow of the medium.

Another object of my invention is to provide a safety system that will disconnect a furnace fuel-supply system or other apparatus from a source of liquid or gaseous fuel upon failure of a flame of the furnace.

A still further object of my invention is to provide a system of the class described that shall be of such a character as to retain the instantaneous-operation feature throughout its entire life and under substantially all ordinary conditions of operation of a furnace.

In practicing my invention, I provide a control means for the fuel, actuable in accordance with the conductivity of an air gap subjected either directly to a flame of the furnace or indirectly thereto or to the heated products of combustion of the burning fuel. In a preferred form of my invention, as practiced at present, I associate with the electrodes defining an ionizable gap the conductivity of which is to be measured by an electric-discharge device, the operation of which is controlled by the direct conductivity of the flame or by the conductivity of a gap. However, in its practice, my invention is not necessarily limited to the use of such an electric-discharge device.

Figure 1:
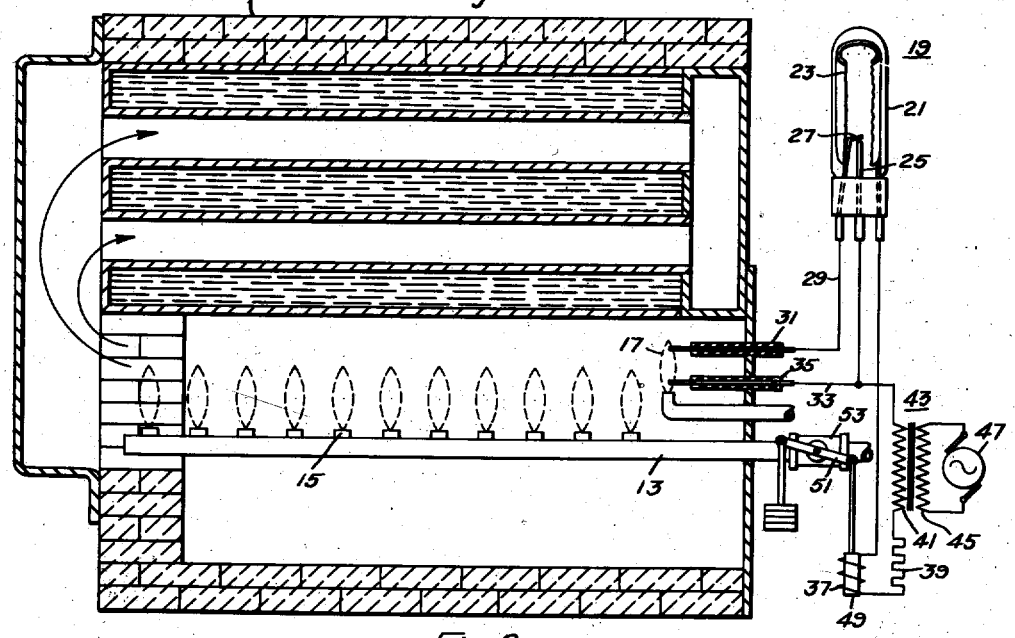
Figure 1 is a view, partly diagrammatic and partly sectional, of a furnace heater equipped with a preferred embodiment of my invention.

Referring more particularly to Fig. 1 of the drawings, a furnace or heater 11 is provided with a mobile-fuel-supply line 13 and a plurality of burners 15.

A supply line 13 feeds also a pilot flame 17 which is usually continuous.

A grid glow tube 19 is operatively associated with the furnace 11 and comprises a container or casing 21, a cathode 23, an anode 25 and a control grid 27. A conductor 29 is connected to the grid 27 and extends, through an insulating bushing 31 in a wall of the furnace, into the space normally occupied by the upper end of the pilot flame 17. The inner end of the conductor 29 is, of course, connected to a suitable electrode material capable of withstanding continuously the high temperature of a flame. The anode 25 is connected, by a conductor 33, to a second electrode having its inner end located in the space occupied by the lower end of the flame 17, an insulating bushing 35, similar to the bushing 31, being provided therefor. Instead of connecting the anode 25 to an electrode, as just described, the conductor 33 may be connected, either conductively or capacitatively, to the fuel-supply line 13 with substantially as good results. I preferably make the electrodes connected to the wires 29 and 33 of a heat-resisting and non-oxidizable alloy, such as nichrome or the like, and it is also essential that the insulating bushings 31 and 35 be made of a material having a very high surface resistivity. The grid glow tube hereinbefore described is constructed according to the disclosure of a co-pending application filed by me November 19, 1926 bearing Serial No. 149,290 and assigned to the Westinghouse Electric & Manufacturing Co.

As explained in my earlier application, the grid-glow tube 19 is a discharge device comprising a plurality of electrodes 23, 25 and 27 immersed in an atmosphere of a gas such as neon. The gas is maintained at a pressure of the order of 2 mm. of mercury.

When an alternating potential is impressed between the anode and the cathode, no current will flow therebetween, as the grid is effectively insulated, but, upon establishing a grid leakage path, the gas in the tube will become ionized and a substantially rectified current will flow in the output circuit thereof. The transition from the non-conductive to the conductive condition of the tube is abrupt.

An output circuit is connected between the cathode 23 and the anode 25 and comprises an actuating solenoid 37, a resistor 39 and the secondary winding 41 of a transformer 43. The primary winding 45 of the transformer is connected to a source 47 of alternating current.

A core member 49 of magnetic material cooperates with the coil 37 and is suspended from an arm 51 which is permanently connected to a fuel-supply-controlling valve 53 interposed in the fuel-supply line 13. The arm 51 is extended beyond its point of connection with the valve, and a heavy weight 55 is connected to the other end thereof.

Figure 2:
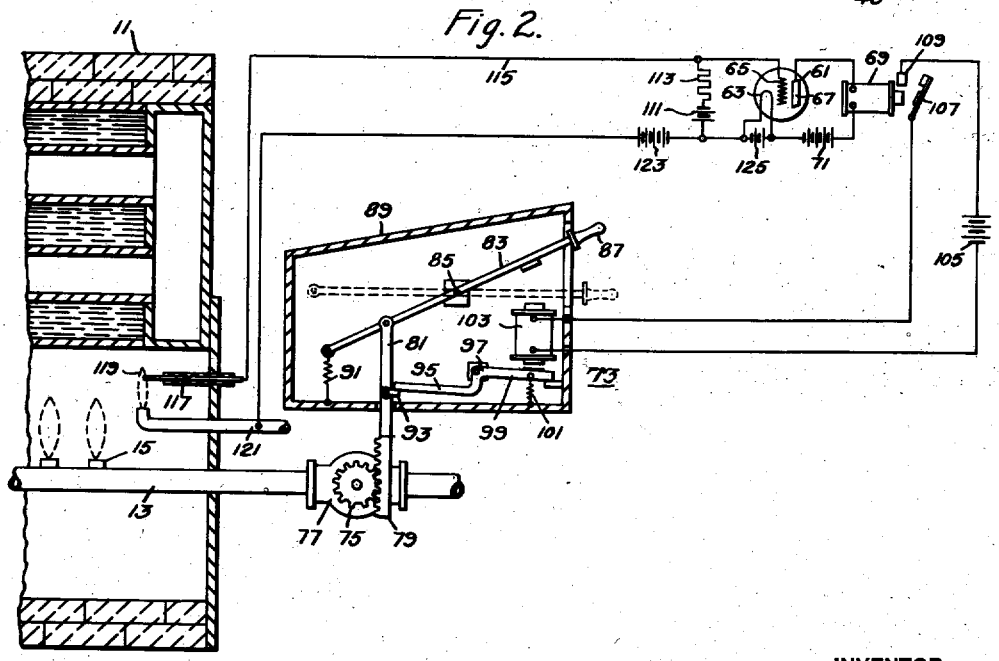
Fig. 2 is a diagrammatic view of an alternative form of my invention.

Referring more particularly to Fig. 2 of the drawings, a thermionic tube 61 has a filament 63, a grid 65 and a plate 67 which is so arranged and connected to the winding of a highly sensitive relay 69 as to include, in the output circuit thereof, in series-circuit relation, a source 71 of direct-current potential.

A self-locking valve-operating mechanism 73 is controlled by the relay 69. The valve-operating mechanism 73 may comprise a pinion 75 rigidly mounted on the stem of a valve 77 and having associated therewith an actuating rack 79 provided with an extension 81 pivotally connected to a lever 83. The lever 83 has a fulcrum 85 intermediate the point of its connection with the link 81 and a handle 87 which projects beyond a protection casing 89. A spring 91 is connected between the end of the lever opposite to the handle 47 and to the casing and tends to so move the lever 83 as to maintain the valve 77 in its closed position.

A movable latch element 93 is pivotally connected to, and carried by, the extension 81 and cooperates with a movable detent or latch 95 to retain the valve in its closed position. The latch 95 is connected to a bell crank 97, one arm 99 of which has a biasing spring 101 connected thereto, and which may also be controlled by an electromagnet 103. The electromagnet is energized from a suitable source 105, the circuit being controlled by a switch arm 107 and a fixed contact member 109 associated with, and controlled by, the relay 69. A biasing battery 111, in series with a grid-leak resistor 113, is connected between the grid 65 and the filament 63 of the tube and biases the grid negatively with respect to the filament. A conductor 115 is connected to the grid 65 and to one terminal of the resistor 113, as well as to an insulated electrode 117, projecting through a wall of the furnace, the inner end of the electrode being located in the upper portion of the space normally occupied by a pilot flame 119. The filament 63 of the tube is connected to a metallic portion 121 of the pilot burner through a biasing battery 123, the battery serving to impart a positive potential to the flame-ionized path and, consequently, a positive potential to the grid 65 when the flame is burning. A source of electric potential 125 energizes the filament 63.

Figure 3:
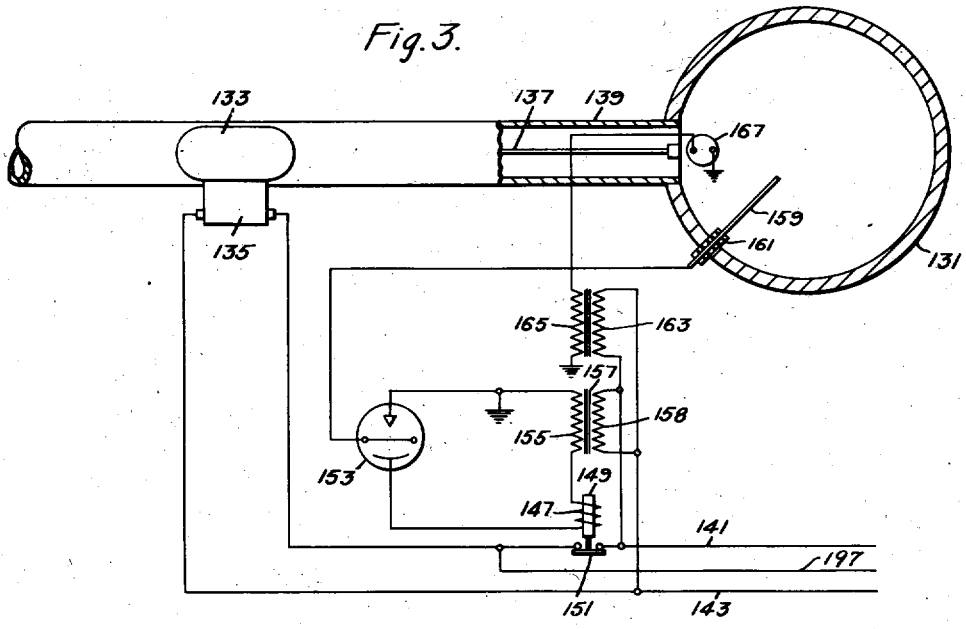
Fig. 3 is a view partly diagrammatic and partly sectional, of a still further modification of a device embodying my invention.

Referring more particularly to Fig. 3 of the drawings, I have here illustrated another form of furnace and fuel-supply mechanism comprising a metal furnace casing 131, having associated therewith an air pressure device 133 driven by an electric motor 135. The device 133 may be any positive pressure blower usually employed in connection with oil burners and is effective to force a quantity of oil through a supply conduit 137 to be atomized by suitable means well known in the art and to burn within the furnace casing 131. At the same time, air is supplied, under pressure, within the conduit 139, whereby a highly effective flame is obtained within the furnace casing 131.

A supply circuit for the control system and for the motor may comprise conductors 141 and 143, the supply of energy from which to the motor and to the safety system is controlled by protecting devices well known in the art. A relay in the supply circuit to the motor comprises a coil 147, a core 149, having associated therewith a contact bridging member 151 and suitable substantially fixed contact members.

A grid glow tube 153, of the kind described in detail in connection with Fig. 1 of the drawings, is provided and has its cathode connected to one terminal of the coil 147. The other terminal of the coil 147 is connected to one terminal of the secondary coil 155 of a suitable transformer comprising the usual core 157 and a primary winding 158. The other terminal of the secondary winding 155 is connected to the anode of the grid glow tube and is also connected to ground. The control grid of the grid glow tube is connected to an electrode 159 extending through an insulating bushing 161 mounted in the wall of the casing 131, the electrode extending well into the zone or space normally occupied by the flame.

An ignition transformer is provided and comprises a primary winding 163, the usual core member and a secondary winding 165. One terminal of the secondary winding 165 is connected to ground while the other terminal thereof is connected to a suitable ignition device 167, usually constituted by a spark gap.

The primary coils or windings 158 and 163 are connected by suitable conductors to the supply-circuit conductors 141 and 143.

Figure 4:
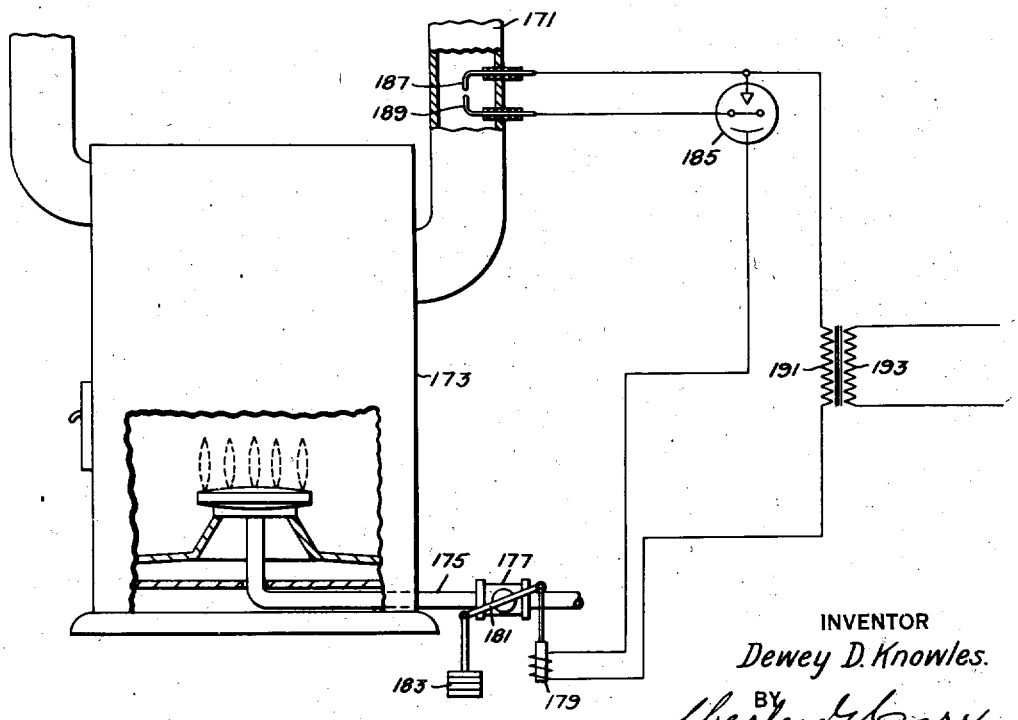
Fig. 4 is a view, partially diagrammatic and partially in side elevation, of another modification of a device embodying my invention.

Referring to Fig. 4, I have there illustrated another modification in which a control air gap is located in the stack or flue 171 of a furnace 173, which is supplied with mobile-fuel through a supply pipe 175. A valve 177 is connected in the pipe and is held in the open position by the action of a core 179 connected to one end of a lever 181 mounted on the valve stem, a relatively heavy weight 183 being connected to the other end of the lever. An electric discharge device 185, as hereinbefore described, has its anode connected to one electrode 187 located in the stack or flue. A second electrode 189 cooperates with the electrode 187 to define a gap the conductivity of which is affected by the products of combustion of the furnace, and is connected to the control electrode of the device 185. The cathode of the device is electrically connected to one terminal of a secondary coil 191 of a transformer the primary coil 193 of which is energized from a suitable source of potential (not shown). The other terminal of the secondary coil 191 is electrically connected to one terminal of a relay coil 195 operatively associated with the core 179.

Referring more particularly to Fig. 1 of the drawings, it is assumed that the pilot flame is burning and that the transformer 43 is energized, whereby the grid glow tube 19 is energized between the cathode and the anode. As is pointed out in my co-pending prior application, a discharge will be maintained in the tube so long as a leakage path is maintained between the anode and the grid, and, in Fig. 1 of the drawings, this leakage path is provided more particularly by the pilot flame. I have found that the conductivity of a flame is sufficiently high to prevent the accumulation of a blocking charge on the grid 27 of the tube so that, as long as the pilot flame is burning, a current will flow in the circuit including the anode and cathode of the tube, the coil 37, the resistance 39 and the secondary winding 41.

The resistance of the resistor 39 is so selected that the current traversing the coil 37, as long as the pilot flame is burning, is just sufficient to retain the core 49 in the position illustrated in Fig. 1 of the drawings, it being understood, of course, that suitable initial adjustments have been made. To start the operation of the furnace, it is merely necessary that the core member 49 be forced downwardly against the action of the weight 55, thus opening the valve and permitting ignition of the fuel issuing from the burners 15. Should the pilot flame 17 be extinguished, for any reason whatsoever, the leakage path provided thereby between the grid electrode and the anode of the grid glow tube would be no longer present and the grid 27 would acquire a sufficiently high negative charge to stop the discharge between the anode and the cathode, all as explained in my application Serial No. 149,290. As soon as the glow discharge between the anode and the cathode ceases, the coil 37 is, of course, deenergized, whereby the weight 55 is permitted to drop and to close the valve to shut off any further supply of fuel.

It is, of course, obvious that, when the coil 37 is not energized, the valve 53 cannot be kept open except by manually holding the core 49 down against the action of gravity on the weight 55, and the likelihood of the furnace being filled with unburned fuel when the pilot flame is not burning is, therefore, very remote.

It will also be obvious that the occurrence of flame at the electrodes 31, 35 will result in reduction to a low value of the potential difference therebetween. Hence, sputtering or arcing of the electrodes is absent, thereby prolonging their useful life.

While Fig. 1 shows the use of a grid glow tube in combination with a safety control system, I have found that an ordinary thermionic amplifying device may be used, particularly in places where an alternating-current supply of electric energy is not available. Such a system is shown in Fig. 2 of the drawings. By suitably adjusting the voltage of the biasing batteries 113 and 123, the potential of the grid 65 may be maintained so long as the pilot flame 119 is burning.

As is well known in the art, a positive bias on the grid of a thermionic tube permits the flow of space current, and this current is utilized to energize the relay 69 whereby to maintain the contact arm 107 in engagement with the contact member 109.

So long as the arm 107 is in engagement with the contact member 109, the electromagnet 103 is energized and detent 95 is maintained out of engagement with the latch 93, permitting manual depression of the lever 83 and, consequently, opening of the valve 75. After having been manually moved, the lever 83 will be maintained in its depression position against the action of the spring 91 by the electromagnet 103, thus keeping the valve 77 open so long as the electromagnet 103 is energized.

Upon extinction of the pilot flame, the grid-bias balance is destroyed, the grid being then biased negatively by the battery 111 to a potential sufficient to block the tube and stop the current in the relay 69. Switch arm 107 is then moved to disengage contact 109, whereby electromagnet 103 is deenergized and valve 77 is permitted to close under the action of spring 91, the movable detent 95 being moved to the left into operative position under the influence of spring 101.

In its downward travel, the latching element 93 passes by the end of the latch or detent 95, and the subsequent engagement of member 93 with the under portion of the member 95 prevents the extension 81 and, therefore, the rack bar 79, from being raised by the lever 83 until the detent 95 is moved toward the right by the action of electromagnet 103.

It is thus apparent that, by utilizing my invention in connection with gas or oil-fired furnaces or the like, it will be substantially impossible for a careless workman to open the main fuel-supply valve and to leave it in the open position if the pilot flame is not burning.

Referring more particularly to Fig. 3 of the drawings, it is assumed that a room thermostat (not shown) closes to effect closing of the circuit of the motor 135, whereby oil is forced into the casing 131 in an atomized condition and is ignited by the ignition device 167 in a manner well known in the art. The electrode 159 is so located as to project into the flame and a conducting or grid leakage path is, therefore, provided between the grounded anode of the grid glow tube 153, the usually more or less grounded metal casing 131 and the electrode 159, the outer end of which is connected to the control grid of the tube 153. The conductivity of the flame of the burning fuel is sufficiently high to provide the proper grid leakage path so that a current will traverse the coil 147 as long as the electric system is energized and as long as a flame exists within the burner casing 131. It is obvious that a shunt circuit to the relay contacts normally bridged by member 151, should be included in the system, to permit of starting up the system and a conductor 197 is shown as being provided for this purpose. As this part of the system constitutes no part of my invention, it is not illustrated or described in detail.

If, for any reason, the supply of an atomized mobile fuel should be interrupted, as may happen in case of a slug of water occurring in the pipe line, the flame would be extinguished and the tendency of the room thermostat would, of course, be to remain closed for a certain length of time, which may be as much as 60 seconds, during which time the motor would continue to operate and a supply of atomized fuel might collect in the burner casing 131. As soon as the flame is extinguished, however, the grid leakage path will no longer exist, so that the current traversing the coil 147 of the control relay will be interrupted within a few seconds, whereby the motor-control circuit is opened and the motor is shut down. The initial control means is thus a normally continuously energized closed-circuit means, which is, also, a voltage-responsive means.

While Figs. 1 and 2 show the use of a pilot flame as constituting a conducting path between two electrodes connected, respectively, to a control grid and another electrode of the electrical discharge device, it is possible also to use the main flame of the burning fuel to provide this conducting path, and this is illustrated in Fig. 3.

However, the device embodying my invention is not restricted to the use of a flame-ionized path or gap located between, and defined by, a pair of spaced electrodes. I may use any portion of the space either in the combustion chamber normally ionized by the combustion products and substantially deionized upon the cessation of the main flame or I may locate the electrodes defining an ionizable gap at any place where the gap is subjected to the action of the flame or of the products of combustion thereof, the main requisite being that the gap is ionized to a sufficient extent to increase its conductivity to such value as will permit a current to flow therethrough to operate the control-circuit means. Such location is shown in Fig. 4 of the drawings.

It is, of course, obvious that it is not always necessary to employ two special electrodes, as shown in Figs. 1 and 4. Only one special electrode may be utilized, as shown in Figs. 2 and 3, the other electrode being constituted by the pipe 121 in Fig. 2 or by the grounded casing 131 of Fig. 3.

As my invention, in its broadest aspects, is not limited to a control valve or even to an electric motor, I prefer to use the phrase "an actuable means" to designate the device, appliance, or system, which is controlled or actuated by, and in accordance with, my invention.

I have elected to show the operation of an electrical discharge device in connection with a safety system for fuel burners and have also shown and described specific locations of the electrodes in connection therewith. Obviously, my system is not limited thereto and I may make modifications therein without invading the field of the pertinent prior art, and I desire, therefore, that the appended claims shall be limited in scope only as demanded by such prior art.

I claim as my invention:

1. In a fuel-supply system of the general type having means for burning mobile fuel, said means including a pilot burner, current-operated means for controlling the flow of said fuel, means including an electric-discharge device having main electrodes and a control electrode, a source of potential, an output circuit for the discharge device including said main electrodes, source of potential and fuel-flow-controlling means, a pair of conductors making contact with the flame of said pilot burner and connections between one of said conductors and one of said main electrodes and between the other of said conductors and said control electrode.

2. In a fuel-supply system of the type including a fuel burner and means for supplying fuel thereto, a current-controlled shut-off means for said fuel-supply means, conducting terminals positioned in the path of flow of the products of combustion of said burner, an electric-discharge device having main electrodes and a control electrode, means for including said main electrodes in circuit with said shut-off means and a source of voltage, and conductors connecting one of said terminals to one of said main electrodes and the other said terminal to said control electrode.

3. In a fuel burner system of the type including a fuel-supply means and a shut-off device therefor, current-controlled means for controlling said shut-off device, including a gaseous electric-discharge device having main electrodes and a control electrode between them, said main electrodes being connected in series with said current-controlled means and a source of alternating voltage, and conductors, connected respectively to said control electrode and one of said main electrodes, electrically connected by contact with the flame of said fuel.

4. In a fuel burner of the type including a fuel-supply means, an electrically actuated control means for maintaining fuel flow through said fuel-supply means and a normally-closed-circuit, including an electric-discharge device having a casing having a plurality of main electrodes and a control electrode within it, said principal electrodes being in circuit with said control means and a source of voltage, said control electrode being connected to a conductor positioned in the path of flow of the products of combustion of the burner, and one of said main electrodes being connected to another conductor positioned in said path.

5. In combination with a burner, means for controlling the flow of fuel thereto and spaced electrodes positioned in the path of flow of combustion products from said burner, electrical means operative when combustion products from said burner contact said electrodes to cause between said electrodes an electric discharge so minute as to be incapable of igniting fuel and as a result of such discharge to render operative said fuel controlling means.

6. In combination with a burner, means for controlling the flow of fuel thereto, a pilot burner for igniting said fuel, and spaced electrodes positioned in the path of flow of combustion products from said pilot burner, electrical means operative when combustion products from said pilot burner contact with said electrodes to cause between said electrodes an electric discharge so minute as to be incapable of igniting fuel and as a result of such discharge to simultaneously render operative said fuel controlling means.

7. In combination with a burner, means for controlling the flow of fuel thereto and spaced electrodes positioned in the path of flow of combustion products from said burner, electrical means operative when combustion products from said burner contact said electrodes to cause between said electrodes an electric discharge so minute as to be incapable of igniting fuel and for amplifying said discharge and as a result of such discharge to render operative said fuel controlling means.

8. In combination with a burner and electrically operated means for controlling the flow of fuel thereto, an electrical control device normally operative to block current flow in circuit with said electrically operated means and a source of electrical power; a second circuit including said control device, and spaced electrodes positioned in the path of flow of combustion products from said burner whereby combustion products contacting said electrodes will cause an electric discharge between said electrodes so minute as to be incapable of igniting fuel, which discharge renders said control device operative to permit current flow.

9. In combination an electric discharge device having a control electrode and a plurality of principal electrodes and a gaseous medium, said device being of the type that has an energized condition and a deenergized condition and is capable only of abrupt transition from one condition to the other, means for impressing a potential difference between said control electrode and one of said principal electrodes to maintain said discharge device in one of said conditions, and means for controlling the condition of said device, said means comprising an electrical conduction path including a space and means for producing combustion in the region of said space, whereby said space is ionized by combustion products, and means for directly coupling said conduction path between said control electrode and said one of said principal electrodes whereby in the absence of a flame in said space a potential difference exists across said space and occurrence of a flame in said space produces a decrease in said last-named potential difference and a change in the condition of said discharge device.

10. In combination a plurality of cold electrodes disposed in an evacuated container containing a gaseous medium, means for impressing an energizing potential between said electrodes, a third electrode interposed between said first-named electrodes and normally insulated therefrom, means, comprising an electrical conduction path including a gap, directly coupled between said third electrode and one of said first-named electrodes, whereby a difference of potential is normally impressed across said gap and between said third electrode and said one of said first-named electrodes and the passage of a space current between said first-named electrodes is blocked, and means for producing combustion in the region of said gap whereby said gap is ionized by combustion products, and said third electrode is electrically connected to said one of said first-named electrodes, thereby substantially at the same time to reduce the potential difference across said gap and to render said third electrode ineffective in blocking a space current between said first-named electrodes.

11. In combination an electric discharge device having a control electrode and a plurality of principal electrodes in a gaseous medium, said device being of the type that has an energized condition and a deenergized condition, is capable only of abrupt transition from its deenergized condition to its energized condition as the distribution of potential between said control electrode and said principal electrodes is varied and is capable only of abrupt transition from its energized condition to its deenergized condition when the potential impressed between its principal electrodes is reduced to a predetermined value, means for impressing between said principal electrodes a potential that periodically falls below the predetermined value at which said device becomes deenergized immediately after being energized, thereby to periodically produce a tendency to deenergize said electric discharge device after its energization and to render it periodically responsive to the electrical condition of said control electrode, an electrical conduction path including a gap directly coupled between said control electrode and one of said principal electrodes whereby the potential difference existing between said control electrode and said one principal electrode is impressed across said gap, and means for producing combustion in the region of said gap whereby said gap is ionized by the products of said combustion, thereby substantially at the same instant to reduce the potential across said gap and to energize said device when it is in deenergized condition.

DEWEY D. KNOWLES.